United States Patent Office 3,534,110
Patented Oct. 13, 1970

3,534,110
PRODUCTION OF PHENOL BY THE CATALYTIC DEHYDROGENATION OF CYCLOHEXANOL AND/OR CYCLOHEXANONE
Bernard Juguin, Rueil-Malmaison, Jean Miquel, Paris, Jean-Francois Le Page, Rueil-Malmaison, and Claude Roux-Guerraz, Paris, France, assignors to Institut Francais du Petrole des Carburants et Lubrifiants, Rueil-Malmaison, Hauts-de-Seine, France
No Drawing. Filed Dec. 6, 1966, Ser. No. 599,389
Claims priority, application France, Dec. 8, 1965, 41,481; June 7, 1966, 64,576; June 8, 1966, 64,755
Int. Cl. C07c *37/06;* B01j *11/06, 11/32*
U.S. Cl. 260—621                                  10 Claims

ABSTRACT OF THE DISCLOSURE

Process and catalyst for manufacturing phenol by catalytic dehydrogenation of cyclohexanol or cyclohexanone, wherein the catalyst contains platinum and preferably also iridium on a silica carrier of 100–300 m.$^2$/g. specific surface and 0.7–1.1 cc./g. porous volume.

This invention relates to an improved process for the preparation of phenol by the catalytic dehydrogenation of cyclohexanol and/or cyclohexanone in a presence of a catalyst comprising platinum deposited on silica.

It is well known that phenol is an important industrial chemical, and that years of effort have been directed to the improvement of the economics and the ease of operation of processes for the production of this compound.

One process which has already been proposed is to dehydrogenate cyclohexanol and/or cyclohexanone by passing same over a catalyst containing a metal of Group VIII of the Periodic Table, at a temperature of generally about 325–425° C., under a pressure of about 0.1–20 kg./cm.$^2$. As the catalyst, the preferred type has been platinum deposited on a support such as activated carbon, alumina, pumice, kieselguhr, or silica. It is further preferred to conduct the reaction in the presence of hydrogen at a ratio of about 0.2–15 mols per mol of cyclohexanol and/or cyclohexanone. Though this process was promising, it was not possible to obtain all the following desirable process characteristics:

(a) A high rate of conversion by the utilization of catalysts containing less than 1.5–2% by weight of a noble metal of Group VIII of the Periodic Table;

(b) A selectivity which would result in the avoidance of undesired by-products such as dehydrated compounds (wherein the hydroxyl group is split out), and products of condensation or polymerization;

(c) A prolonged catalyst activity, which would permit the employment of the process on an industrial scale;

(d) A simple method for the regeneration of the catalyst, it being particularly desirable to merely burn carbonaceous deposits.

An object of this invention, therefore, is to provide an improved process which can simultaneously meet the above-stated requirements.

Another object is to provide an improved catalyst composition.

Upon further study of the specification and appended claims, other objects and advantages of this invention will become apparent.

For the attainment of the above objects, there is provided a process based on the utilization of catalysts containing less than 2%, preferably less than 1%, of platinum deposited on a support of activated silica (i.e., silica previously activated by heat at a temperature higher than 300° C., for example 300–800° C.), containing 0.4–2%, preferably 0.7–1.3%, by weight of an alkali metal or an alkali earth metal compound, expressed, for example, as Na$_2$O or CaO. This catalyst support has a specific surface of between 100 and 300 m.$^2$/g., preferably 175–225 m.$^2$/g., and a pore volume of 0.7–1.1 cm.$^3$/g. It is further preferred that at least 80% of the pore volume comprises pores having a diameter of 100–500 angstroms.

It is preferred to employ platinum in a concentration of 0.1–1% and more preferably 0.3–0.5% by weight of the total catalyst composition. Furthermore, according to a preferred embodiment of this invention, the catalyst must also contain iridium.

One aspect of this invention is the discovery that the life of those catalysts containing platinum and iridium is longer than such catalysts which contain only platinum. Without being bound by an explanation of this discovery, it appears that the iridium-platinum composition is more highly dispersed in the catalyst composition. X-ray diffraction studies have shown that the aging of the catalysts based on platinum was principally due to an enlargement or fritting of the platinum microcrystals. It appears, then, that the presence of iridium favors the formation of very fine micrograins, thereby tending to eliminate the formation of large crystals of platinum, and thereby increasing the longevity of catalyst life.

The effect of the use of iridium was entirely unexpected inasmuch as catalysts containing only iridium deposited on a support exhibit a poor selectivity, and a mediocre stability when employed in the dehydrogenation of cyclohexanol to produce phenol.

In the present invention, the weight percent of iridium in the overall catalyst composition is about 0.05–0.6 times the content of platinum, advantageously 0.1–0.4 times, and preferably about 0.2–0.3 times. Below these limits, no improvement in catalyst activity is apparent; above these limits, the iridium effects a significant decrease in the selectivity of the catalyst. In absolute terms, the weight percent of the iridium in the overall catalyst composition is usually about 0.05–1%.

With respect to the catalyst supports, it is usually essential that the silica contain 0.4–2% by weight of an alkali metal or an alkaline earth metal compound, said percentages being expressed as Na$_2$O or CaO, before the platinum is incorporated thereon. If these metals are not present in the silica supports, the selectivity of the catalyst composition is considerably reduced.

If the support contains less than 0.4% of the alkali metal or alkaline earth metal catalyst, the undesired side reaction of dehydration of cyclohexanol is favored. On the other hand, if more than 2% of such metals are incorporated in the silica supports, then the condensation reactions of cyclohexanone become troublesome.

The alkali metals or alkaline earth metals can be incorporated in the silica supports at the time of fabrication or agglomeration. The metals can be introduced in the form of the hydroxides, oxides or carbonates, for example, CaO, KOH, NaOH, K$_2$CO$_3$, Na$_2$CO$_3$, Na$_2$O, or K$_2$O. With respect to the particular geometrical form of the silica supports, it is preferred to employ either pellets or rods, but it is, of course, possible to employ any number of different types of shapes and still obtain satisfactory results.

It is particularly convenient to deposit the platinum on the silica by the utilization of a solution containing the metal, for example, an aqueous solution of platinum chloride, or hexachloroplatinic acid, or a hexachloroplatinate of an alkali metal or ammonium. Of course, other conventional methods for depositing platinum on a support can also be used.

With respect to the preferred embodiment of this invention wherein iridium is employed, it is also preferably deposited on the catalyst support by the use of a solution containing the metal, for example, a solution of irridium tribromide, or iridium dichloride, or hexachloiridic acid, or ammonium or alkali metal hexachloroiridate. By the utilization of solutions, it is possible, and also preferred, to deposit the platinum and iridium simultaneously. It is also preferred that the iridium solution be freshly prepared.

When pellets of silica are employed (pellets in this sense being round, small balls), the particular manipulative technique for impregnating the support is important. It has been observed that when the pellets are immersed in an aqueous solution of platinum or iridium compounds, there is a flaking or scaling of the pellets. This disadvantage can be avoided by utilizing as the solvent of the platinum or iridium compound, alcoholic or ketonic aqueous solutions, the concentration of the alcohol or ketone preferably being about 30–70% by volume of the solution.

Solutions of the noble metal compounds are generally acidic. Consequently, in order to preserve a satisfactory selectivity of the catalyst, it is necessary to neutralize this acidic content by the incorporation in the catalyst of compounds having a basic reaction, or which decompose to yield compounds having a basic reaction, such decomposition being during the period of catalyst fabrication or utilization.

As examples of the compounds which can be used to counteract the acidity of the noble metal solutions, there are included hydroxides and oxides of alkali metals or alkaline earth metals, as well as carbonates and other salts of weak acids of these same metals. The weight percent of the alkali metal or alkaline earth metal compounds added to the catalyst is advantageously about 0.3–3 times the content of the noble metal catalyst of Group VIII, preferably 0.8–1.5 times this content. In the final catalyst composition, the content of the alkali metal or alkaline earth metal is usually about 0.5–3% by weight, expressed as CaO or $Na_2O$. It is also preferred to employ alcoholic or ketonic aqueous solutions of the alkali metal or alkaline earth metal compounds in order to prevent flaking of the catalyst support. The best results are obtained with a solution of potassium carbonate in a mixture of 30% acetone and 70% water, by volume.

The order of the impregnation steps is important, for it is desirable to deposit the platinum and the iridium, if incorporated, before the addition of the alkali metal or alkaline earth metal compound. If the catalysts are not prepared by the order of these steps, the resulting catalyst compositions are inferior with respect to activity, selectivity, and catalyst life.

When the catalyst support has the form of silica pellets, the best catalysts are those which are prepared in the order of the following steps:

(1) Impregnation of the support by a solution of platinum and iridium compounds, in an aqueous solution containing 30–90% by volume of acetone;

(2) Drying, for example, at about 60–100° C.;

(3) Impregnation of the resultant dried catalysts with a solution of an alkali metal or alkaline earth metal compound in an aqueous solution containing 20–50% by volume of acetone;

(4) Drying, for example, at 100–110° C.;

(5) Calcination, for example, by heating 2–5 hours under a current of air at a temperature of about 300–400° C.;

(6) Reduction of the catalyst by passing hydrogen at above 300° C., for example, at 350–450° C., for a period of about 5–15 hours, the hourly rate of hydrogen being about 250–1,000 times the volume of catalyst.

The last-described operation is preferably conducted directly in the dehydrogenation reaction. It is further to be noted, moreover, that step (5) is not absolutely necessary.

The resultant catalysts obtained by the above method have approximately the same specific surface and the same pore volume as the initial silica material.

In order to obtain the highest benefits of the novel catalyst compositions of this invention, it is important to observe particular reaction conditions for the conversion of cyclohexanol or cyclohexanone into phenol. Thus, in order to obtain particularly high conversion rates and selectivities, the temperature should be about 320–450° C., preferably 370–420° C. The volumetric hourly rate of the cyclohexanol and/or cyclohexanone liquid should be on the order of about 0.1–3 times the volume of the catalyst, advantageously about 0.5–1.0. The total absolute pressure in the reactor should be about 0.5–10 kg./cm.$^2$, preferably 1–3 kg./cm.$^2$. Furthermore, since the partial pressure of hydrogen exhibits a great influence on the stability of the catalysts, the molar ratio of hydrogen/cyclohexanol and/or cyclohexanone entering the reactor should be about 0.5–15, advantageously 2–10, and preferably 3–6.

Without further elaboration, it is believed that one skilled in the art can, using the preceding description, utilize the present invention to its fullest extent. The following preferred specific embodiments are, therefore, to be construed as merely illustrative, and not limitative of the remainder of the specification and claims in any way whatsoever.

EXAMPLE I

The object of this example is to demonstrate the effect of the inertness of the catalytic support on the selectivity of the catalyst composition.

(a) A first catalyst having 0.8% by weight of platinum and 1% by weight of potassium carbonate is prepared according to the following technique: As the silica support, there is employed 200 cc. of silica pellets having a density of 0.4, the total weight being 80 grams. The physical characteristics of these silica pellets are as follows:

Specific surface.—190 cm.$^2$/g.
Total pore volume.—105 cm.$^3$/100 g. (90% of the pore volume corresponding to pores having a diameter of about 100–500 angstroms).
Weight percent of $Na_2O$.—0.9%.

The total pore volume of 80 g. of silica pellets is thus 84 cc.

(b) There is prepared 21.3 cc. of an aqueous acetone solution of hexachloroplatinic acid, the content of platinum being 3% by weight, and the volumetric ratio of acetone to water being 4:1. To this solution there is added 62.7 cc. of a 4:1 acetone-water solution, to make up a total solution of 84 cc.

(c) 80 g. of the silica pellets are immersed for twelve hours in the precedingly-described 84 cc. of solution. At the end of the 12-hour period, the silica pellets have completely absorbed all the solution. The thus impregnated pellets are then oven-dried at 100° C. for twelve hours.

The thus dried pellets are then immersed in a solution of 0.800 g. of potassium carbonate dissolved in 75 cc. of a solution containing 30% acetone and 70% water by volume, the immersion period in this case also being twelve hours. At the end of the 12-hour period, the catalyst has completely absorbed this potassium carbonate solution, and the catalyst is then dried in an oven at 100° C. for about twelve hours.

(d) A layer of 100 cc. of the resultant catalyst is then introduced into a steel reactor and subjected to a current of 50 liters/hour of hydrogen for ten hours at 400° C., thereby reducing the catalyst components.

The above-described catalyst is then employed in the reactor, and cyclohexanol is passed therethrough under the following operating conditions:

Temperature.—400° C.
Absolute pressure.—1 kg./cm.$^2$
Space velocity.—1 liter of liquid cyclohexanol per liter of catalyst per hour
Molar ratio of hydrogen/cyclohexanol at the entrance of the reactor.—2

The resultant product recovered at the exit of the reactor is analyzed by gas chromatography—the molar yields are as follows:

| | Percent |
|---|---|
| Phenol | 96 |
| Cyclohexanol | 0.1 |
| Cyclohexanone | 3 |
| Hydrocarbons | 0.7 |
| Water | 0.2 |

The above table indicates that the conversion rate of 96.9% is achieved, simultaneously with a 99% selectivity to phenol (the cyclohexanone is computed as cyclohexanol since it is convertible to phenol). Thus, the selectivity is computed as the ratio of the mol percent of phenol in the product to the rate of conversion of phenol.

For purposes of comparison, a second catalyst is prepared having 0.8% by weight of platinum and 1% of potassium carbonate, while utilizing the same operating techniques. The catalyst support has the same physical characteristics, but it contains only 0.15% by weight of sodium oxide.

Under the same operating conditions, there is obtained the following molar yields:

| | Percent |
|---|---|
| Phenol | 80 |
| Cyclohexanol | 0 |
| Cyclohexanone | 1.5 |
| Hydrocarbons | 15 |
| Water | 3.5 |

The above table indicates that the rate of conversion is 98.5%, but the selectivity to phenol is only 81.5%.

EXAMPLE II

The object of this example is to demonstrate the influence of the physical characteristics of the support on the stability of the catalysts.

There are prepared three catalysts (A, B, and C), having 0.8% by weight of platinum and 1% by weight of potassium carbonate, deposited on activated silica pellets, while using the same operating technique as Example I.

The physical characteristics of the three catalysts differ as follows:

Specific surface: M.$^2$/g.
Catalyst A _____ 35
Catalyst B _____ 190
Catalyst C _____ 290

Total pore volume of the three catalysts is the same (100 cc./100 g.), 90% of the total pore volume corresponding to pores having a diameter of about 100–500 angstroms. The content of sodium oxide (0.9% by weight) is not changed in the catalyst.

Using the operating conditions described in Example I, there three catalysts yield the results tabulated in Table I.

From the results of the preceding table, it is seen that consistent results over a period of fifteen hours are obtained with catalyst B having a specific surface of 190 m.$^2$/g., whereas catalysts A and C over substantially the same period show that composition of the product stream is changing, which means, of course, that the catalyst composition is also changing. Thus, it can be fairly stated that catalyst B is clearly the most stable catalyst.

EXAMPLE III

The object of this example is to demonstrate that the method of preparing the catalyst, particularly the order of steps of impregnation, has a significant and important influence on the catalyst activity.

Pure cyclohexanol and hydrogen are passed over a catalyst having 0.8% by weight of platinum and 1% by weight of potassium carbonate, said catalytic elements being deposited on silica pellets having the following characteristics:

Specific surface—190 m.$^2$/g.
Total pore volume—100 cc./100 g. (90% of the pores having a pore diameter of 100–500 angstroms).
Weight percent of sodium oxide—0.9%.

The technique used to produce the catalyst is the same as described in Example I, that is to say, the platinum is deposited before the potassium carbonate is deposited. By employing the same operating conditions in the dehydrogenation step, as described in Example I, the outlet product stream from the reactor contains the following molar yields:

| | Percent |
|---|---|
| Phenol | 96.9 |
| Cyclohexanol | 0 |
| Cyclohexanone | 0.7 |
| Hydrocarbons | 1.9 |
| Water | 0.5 |

The above table indicates a rate of conversion of 99.3% and a phenol selectivity of 97.5%.

At the end of about 48 hours of operation under the preceding operating conditions, the outlet product stream from the reactor contains the following molar yields:

| | Percent |
|---|---|
| Phenol | 96.2 |
| Cyclohexanol | 0.3 |
| Cyclohexanone | 1.9 |
| Hydrocarbons | 1.3 |
| Water | 0.3 |

The above table indicates that the rate of conversion is 97.8% and the phenol selectivity is 98.4%.

For the purposes of comparison, the same reactants under the same operating conditions are passed over a catalyst having 0.8% by weight of platinum and 1% by weight of potassium carbonate, deposited on the same catalyst support. However, the technique for producing

TABLE I

| Catalyst | Hours of operation | Molar yield, percent | | | | | Rate of conversion | Selectivity |
|---|---|---|---|---|---|---|---|---|
| | | Cyclohexanol | Cyclohexanone | Hydrocarbons | Water | Phenol | | |
| A | 0 | 1.4 | 4.5 | 0.5 | 0.1 | 93.5 | 94.1 | 99.5 |
| | 4 | 2.4 | 7.5 | 0.3 | | 89.8 | 90.1 | 99.6 |
| | 8 | 3.2 | 9.7 | 0.3 | | 86.8 | 87.1 | 99.7 |
| | 14 | 4.3 | 12.2 | 0.2 | | 83.3 | 83.5 | 99.7 |
| | 20 | 6.8 | 12 | 0.2 | | 81 | 81.2 | 99.7 |
| | 24 | 6.2 | 14.5 | 0.2 | | 79.1 | 79.3 | 99.8 |
| B | 0 | | 0.7 | 1.9 | 0.5 | 96.9 | 99.3 | 97.5 |
| | 2 | | 0.5 | 1.7 | 0.4 | 97.4 | 99.5 | 98 |
| | 4 | | 0.5 | 1.3 | 0.3 | 97.9 | 99.5 | 98.5 |
| | 6 | | 0.5 | 1.5 | 0.4 | 97.6 | 99.5 | 98.2 |
| | 8 | | 0.7 | 1.4 | 0.3 | 97.6 | 99.3 | 98.3 |
| | 10 | | 0.7 | 1.3 | 0.3 | 97.7 | 99.3 | 98.4 |
| | 12 | | 0.8 | 1.2 | 0.3 | 97.7 | 99.2 | 98.5 |
| | 15 | | 0.8 | 1.3 | 0.3 | 97.6 | 99.2 | 98.4 |
| C | 0 | | 0.8 | 1.6 | 0.4 | 97.2 | 99.2 | 98 |
| | 2 | | 0.8 | 1.2 | 0.3 | 97.7 | 99.2 | 98.5 |
| | 4 | | 1 | 0.9 | 0.2 | 97.9 | 99 | 98.8 |
| | 6 | 0.1 | 1 | 0.9 | 0.2 | 97.8 | 98.9 | 98.9 |
| | 8 | 0.2 | 1.5 | 1.2 | 0.3 | 96.8 | 98.7 | 98 |
| | 12 | 0.2 | 2 | 1.3 | 0.3 | 96.2 | 97.8 | 98.3 | the catalyst is different, in the sense that the potassium carbonate is deposited before the platinum is deposited. From the reactor, a product stream is obtained having the following molar yields:

| | Percent |
|---|---|
| Phenol | 90.5 |
| Cyclohexanol | 2 |
| Cyclohexanone | 4.5 |
| Hydrocarbons | 2.5 |
| Water | 0.5 |

According to the above table, the conversion rate is 93.5% and the phenol selectivity is 97%.

After six hours of operation under the same operating conditions, the product stream leaving the reactor had the following molar yields:

| | Percent |
|---|---|
| Phenol | 79.5 |
| Cyclohexanol | 9 |
| Cyclohexanone | 7 |
| Hydrocarbons | 3.5 |
| Water | 1 |

According to the preceding table, the conversion rate is 84% and the phenol selectivity 94.5%.

From the comparative data obtained by this example, it is clear that for the best operation, it is necessary to deposit the platinum before the alkaline element, when preparing the catalyst.

EXAMPLE IV

The object of this example is to demonstrate the influence of the platinum content on the activity, selectivity and stability of the catalyst.

There are prepared three catalysts (D, E, and F), having different concentrations of platinum (percent by weight):

D—0.4% platinum and 0.5% potassium carbonate
E—0.8% platinum and 1% potassium carbonate
F—2% platinum and 2.5% potassium carbonate (The reason for the increase in potassium carbonate is to maintain the same ratio of potassium carbonate to platinum in all three catalysts.)

The catalyst support used for the above catalyst composition is the same in all three cases, to wit:

Specific surface—190 m.$^2$/g.
Total pore volume—100 cc./100 g. (90% of the pores having a diameter of 100–500 angstroms).
Weight percent of sodium oxide—0.9%.

The technique for preparing the catalyst, and the operating conditions for preparing phenol are both the same as in Example I.

The results obtained by the use of the three different catalysts are shown in Table II as follows:

EXAMPLE V

Catalyst D of Example IV is utilized for the dehydrogenation of cyclohexanol under the following conditions:

Temperature.—390° C.
Absolute pressure.—2 kg./cm.$^2$
Space velocity.—0.5 (volume/volume/hour)
Molar ratio of hydrogen to cyclohexanol at the entrance of the reactor.—4

At the beginning of the operation, there is obtained a conversion rate of 99% and a selectivity of 97.5%. After 192 hours, these values became 94.5% and 98.4%, respectively.

The catalyst is then regenerated by an air-nitrogen mixture under the following operating conditions:

50 liters of air-nitrogen mixture per liter of catalyst per hour.
Temperature.—350° C.
Duration of regeneration.—5 hours After the catalyst is regenerated, it is employed under the previously-indicated operating conditions of Example V. The molar yields are as follows:

| | Percent |
|---|---|
| Phenol | 96.9 |
| Cyclohexanol | 0.1 |
| Cyclohexanone | 1 |
| Hydrocarbons | 1.6 |
| Water | 0.4 |

The preceding table indicates that conversion is 98.9% and the selectivity about 98%.

This example proves that the catalyst can be regenerated, with substantially no loss in activity.

EXAMPLE VI

The purpose of this example is to demonstrate that the stability of catalysts based on platinum and iridium is higher than catalysts based on platinum alone.

For this purpose, there are prepared two catalysts (G and H), having the following properties:

G—0.4% of platinum and 0.5% of potassium carbonate.
H—0.4% of platinum, 0.1% of iridium, and 0.5% of potassium carbonate.

The same support is employed for both of these catalysts, said supports being pellets of silica having the following characteristics:

Specific surface.—190 m.$^2$/g.
Total pore volume.—100 cc./100 g. (90% by volume of the pores corresponding to pores of a diameter of 100–500 angstroms)
Weight percent (Na$_2$O).—0.9%.

The catalysts are prepared as follows:

Catalyst G.—200 cc. of silica pellets having a density of 0.4 (80 g. of silica pellets), having a total pore volume of 80 cc., are employed as the support materials.

TABLE II

| Catalyst | Hours of operation | Molar yield, percent | | | | | Rate of conversion | Selectivity |
|---|---|---|---|---|---|---|---|---|
| | | Cyclohexanol | Cyclohexanone | Hydrocarbons | Water | Phenol | | |
| D | 0 | | 1 | 2 | 0.5 | 96.5 | 99 | 97.5 |
| | 24 | 0.1 | 1.5 | 1.5 | 0.4 | 96.5 | 98.4 | 98 |
| | 48 | 0.3 | 2.1 | 1.2 | 0.3 | 96.1 | 97.6 | 98.5 |
| E | 0 | | 0.7 | 1.9 | 0.5 | 96.9 | 99.3 | 97.5 |
| | 24 | 0.1 | 1.3 | 1.5 | 0.4 | 96.7 | 98.6 | 98 |
| | 48 | 0.3 | 1.9 | 1.3 | 0.3 | 96.2 | 97.8 | 98.4 |
| F | 0 | | 0.8 | 2.2 | 0.5 | 96.5 | 99.2 | 97.2 |
| | 24 | 0.2 | 1.4 | 1.5 | 0.4 | 96.5 | 98.4 | 98.2 |
| | 48 | 0.2 | 2.2 | 1.2 | 0.3 | 96.1 | 97.6 | 98.5 |

From the preceding table, it appears that the activity, selectivity and stability of the three catalysts are essentially the same. Consequently, it is unnecessary to employ a catalyst having a higher platinum content than about 0.4% by weight.

As the impregnating solution, there is prepared 10.7 cc. of an aqueous acetone solution of hexachloroplatinic acid having 3% by weight of platinum. This solution comprises 80% acetone and 20% water by volume. To this solution are added 69.3 cc. of an aqueous acetone solution having the same volumetric proportions, so that the final solution has a volume of 80 cc.

To the above-described solution there are added the 80 g. of silica pellets, and contact is maintained for twelve hours. At the end of the twelve hours, the silica pellets have completely absorbed the solution. The thus impregnated pellets are then dried in an oven at 100° C. for twelve hours.

Another impregnating solution is made by dissolving 0.4 g. of potassium carbonate and 75 cc. of the solution containing 30% acetone and 70% water by volume. This solution is employed to impregnate the dried catalysts for a period of twelve hours; and at the end of twelve hours, the catalyst has completely absorbed the potassium carbonate solution. Thereupon, the catalyst is again dried in an oven at 100° C. for twelve hours.

Catalyst H.—The method for preparing this catalyst is similar to that used for the preparation of catalyst G. However, there is a necessary difference in the production of the first impregnating solution, as follows:

First, 10.7 cc. of an aqueous acetone solution is prepared wherein said solution contains sufficient hexachloroplatinic acid to correspond to a 3% by weight content of platinum. To this solution there are added 5.3 cc. of a freshly prepared aqueous acetone solution of hexachloroiridic acid, corresponding to 1.5% by weight of iridium. In both cases, the aqueous acetone solution contains 80% acetone and 20% water by volume. These two solutions are combined, and added thereto are 64 cc. of an aqueous acetone solution having the same volumetric proportions, to make up a total of 80 cc.

The process of producing catalyst H is then continued in the same manner as employed for the production of catalyst G, impregnating, drying, impregnating with potassium carbonate, and further drying.

In separate experiments, a layer of 100 cc. of each catalyst is introduced into a steel reactor, and reduced therein for ten hours at 400° C. in a current of hydrogen equal to 50 liters per hour. Pure cyclohexanol is then passed through the reactor under the following operating conditions:

Temperature.—390° C.
Absolute pressure.—2 kg./cm.$^2$
Space velocity.—0.5 volume of cyclohexanol per volume of catalyst per hour
Molar ratio of hydrogen/cyclohexanol at the entrance to the reactor.—4

The two catalysts yield results which are tabulated in the following table:

EXAMPLE VII

Example I is repeated, but in the place of cyclohexanol, a mixture of 86 molar percent cyclohexanol and 14 molar percent cyclohexanone is employed. The results are not significantly different.

Though not described in any of the examples, an advantageous manner of conducting the process of the present invention is to utilize a plurality of catalyst zones having increasing temperatures and/or increasing quantities of catalysts.

The preceding examples can be repeated with similar success by substituting the generically and specifically described reactants and operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and intended to be, within the full range of equivalence of the following claims.

Illustrative examples of such changes are given hereafter.

When equivalent molar proportions of sodium carbonate, potassium hydroxide and sodium hydroxide, respectively, are substituted for potassium carbonate in the manufacture of the first catalyst of Example I, substantially same results are obtained.

Also equivalent results are obtained when there is used as silica pellets, in the manufacture of the first catalyst of Example I, the following, in the same amount:

Density.—0.45
Specific surface.—180 m.$^2$/g.
Total pore volume.—100 cm.$^3$/100 g.
Weight percent of $K_2O$.—1.2% (corresponding to 0.8% $Na_2O$).

What is claimed is:
1. A process for the production of phenol which comprises dehydrogenating a reactant selected from the group consisting of cyclohexanol, cyclohexanone, and mixtures thereof, in the presence of a catalyst, the improvement comprising utilizing as the catalyst as catalyst composition comprising about 0.1–2% by weight of platinum and 0.05–1% by weight of iridium, said platinum and iridium being supported by a material consisting essentially of silica, the content of iridium being 0.05–0.6 times the weight percent of the platinum in the catalyst composition.

2. A process as defined by claim 1 wherein the content

TABLE III

| Catalyst | Hours of operation | Molar yield, percent | | | | | Rate of conversion | Selectivity |
| | | Cyclohexanol | Cyclohexanone | Hydrocarbons | Water | Phenol | | |
| --- | --- | --- | --- | --- | --- | --- | --- | --- |
| G | 0 | 0.1 | 0.9 | 2 | 0.5 | 96.5 | 99 | 97.5 |
|   | 12 | 0.2 | 1 | 1.6 | 0.5 | 96.7 | 98.8 | 98 |
|   | 24 | 0.2 | 1.3 | 1.6 | 0.4 | 96.5 | 98.5 | 98 |
|   | 36 | 0.3 | 1.5 | 1.6 | 0.4 | 96.2 | 98.2 | 98 |
|   | 48 | 0.3 | 1.8 | 1.6 | 0.4 | 95.9 | 97.9 | 98 |
|   | 72 | 0.5 | 2 | 1.6 | 0.4 | 95.5 | 97.5 | 98 |
|   | 96 | 0.8 | 2.2 | 1.5 | 0.4 | 95.1 | 97 | 98.2 |
|   | 144 | 1.4 | 2.8 | 1.4 | 0.3 | 94.1 | 95.8 | 98.4 |
|   | 192 | 2.1 | 3.4 | 1.3 | 0.3 | 92.9 | 94.5 | 98.4 |
| H | 0 |  | 1.2 | 1.4 | 0.3 | 97.1 | 98.8 | 98.3 |
|   | 12 |  | 1.1 | 1.8 | 0.4 | 96.7 | 98.9 | 97.8 |
|   | 24 |  | 1.2 | 1.7 | 0.4 | 96.7 | 98.8 | 97.9 |
|   | 36 |  | 1.2 | 1.5 | 0.4 | 96.9 | 98.8 | 98 |
|   | 48 |  | 1.3 | 1.2 | 0.3 | 97.2 | 98.7 | 98.4 |
|   | 72 | 0.1 | 1.3 | 1.4 | 0.3 | 96.9 | 98.6 | 98.2 |
|   | 96 | 0.2 | 1.4 | 1.4 | 0.3 | 96.7 | 98.4 | 98.3 |
|   | 144 | 0.3 | 1.7 | 1.4 | 0.3 | 96.3 | 98 | 98.3 |
|   | 192 | 0.4 | 1.9 | 1.4 | 0.3 | 96 | 97.7 | 98.3 |

From the results shown in the table, it is clear that the platinum-iridium catalyst is much more stable than the catalyst prepared merely on the basis of platinum. Consequently, it is a substantial advantage of this invention to furnish a catalyst which is much more amenable to industrial scale operations for the production of phenol from cyclohexanol or cyclohexanone.

of iridium is 0.1–0.4 times the weight percent of the platinum in the catalyst composition.

3. A process as defined by claim 1, wherein the content of iridium is 0.2–0.3 times the weight percent of the platinum in the catalyst composition.

4. In a process for the production of phenol which comprises dehydrogenating a reactant selected from the group consisting of cyclohexanol, cyclohexanone and mixtures thereof, in the presence of a catalyst, the improvement comprising utilizing as the catalyst a catalyst composition comprising about 0.1–2% by weight of platinum, 0.05–1% by weight of iridium, 0.5–3% by weight of an alkaline metal selected from the group consisting of an alkali metal and an alkaline earth metal, expressed as $Na_2O$ and $CaO$, respectively, and wherein said catalyst composition further comprises an activated silica support having a specific surface of 100–300 m.$^2$/g. and a pore volume of 0.7–1.1 cm.$^3$/g.

5. The process of claim 4, wherein the content of iridium is equivalent to 0.05–0.6 times the weight percent of the platinum in the catalyst composition.

6. A process as described by claim 4, wherein the dehydrogenation is carried out at a temperature in the range of 320–450° C., with a volumetric hourly rate of the liquid reactant of about 0.1–3 times the volume of the catalyst, the total absolute pressure in the reactor being about 0.5–10 kg./cm.$^2$ and the molar ratio hydrogen/cyclohexanol and cyclohexanone entering the reactor being about 0.5–15.

7. A process as described by claim 5 wherein the dehydrogenation is carried out at a temperature in the range of 320–450° C., with a volumetric hourly rate of the liquid reactant of about 0.1–3 times the volume of the catalyst, the total absolute pressure in the reactor being about 0.5–10 kg./cm.$^2$ and the molar ratio hydrogen/cyclohexanol and cyclohexanone entering the reactor being about 0.5–15.

8. A process as defined by claim 4 wherein the specific surface is 175–225 m.$^2$/g.

9. A process as defined by claim 4, wherein the content of iridium is 0.1–0.4 times the weight perecent of the platinum in the catalyst composition.

10. A process as defined by claim 4, wherein the content of iridium is 0.2–0.3 times the weight percent of the platinum in the catalyst composition.

References Cited

UNITED STATES PATENTS

| | | |
|---|---|---|
| 2,503,641 | 4/1950 | Taylor et al. |
| 3,336,399 | 8/1967 | Gac et al. |

BERNARD HELFIN, Primary Examiner

N. P. MORGENSTERN, Assistant Examiner

U.S. Cl. X.R.

252—459